United States Patent [19]
Sharber et al.

[11] Patent Number: 5,513,935
[45] Date of Patent: May 7, 1996

[54] DECORATIVE NAIL HEAD COVER

[76] Inventors: Elizabeth J. Sharber, 3318 E. Water St., Tucson, Ariz. 85716; Rayma Lee, 1659 W. Stevana Way, Flagstaff, Ariz. 86001

[21] Appl. No.: 331,680

[22] Filed: Oct. 31, 1994

[51] Int. Cl.⁶ .................................................. F16B 15/02
[52] U.S. Cl. ............................ 411/480; 411/482; 411/923
[58] Field of Search ...................................... 411/371, 373, 411/431, 480, 482, 923

[56] References Cited

U.S. PATENT DOCUMENTS

| | | | |
|---|---|---|---|
| 166,145 | 7/1875 | Richards | 414/480 |
| 465,289 | 12/1891 | Platt | 411/480 X |
| 1,435,134 | 11/1922 | Boley | 411/923 X |
| 1,751,799 | 3/1930 | Dickson | 411/923 X |
| 4,158,251 | 6/1979 | Howell | 411/480 X |
| 4,943,197 | 7/1990 | Baritz | 411/480 X |

FOREIGN PATENT DOCUMENTS 17479 of 1901 United Kingdom .................. 411/480

*Primary Examiner*—Neill R. Wilson
*Attorney, Agent, or Firm*—Ogram & Teplitz

[57] ABSTRACT

A decorative cover for the head of a nail and other simlar fasteners used in the carpentry and upholstery trades. Ordinary nails can prove unsightly when used on particular works. The invention is a decorative cover which utilizes a slot to attach the cover to the head of a standard nail. The decorative cover is of any shape and color desired, thereby offering limitless design possibilities. After attachment of the invention to the nail head, the nail is driven into the body of work with no adverse effects on the cover. The invention, then, allows the aesthetic characteristics of a body of work to be enhanced without sacrificing the utilitarian characteristics of the nail.

17 Claims, 2 Drawing Sheets

5,513,935

1

DECORATIVE NAIL HEAD COVER

BACKGROUND OF THE INVENTION

This invention relates generally decorative fasteners and, more particularly, to decorative covers for nails, tacks, and similar devices used in the carpentry and upholstery trades.

Nails have long been used in the carpentry and upholstery trades. Originally, their purpose was exclusively functional. However, when used to assemble decorative works, the heads of nails often ruin the aesthetic appearance intended by the creator of the work. In these situations, the aesthetic, as well as the utilitarian characteristics, of such nails must be considered. Consequently, it became desirable to have a nail which provided all the functional characteristics of traditional nails while serving an enhanced decorative purpose.

In an effort to serve this demand, decorative nails were developed. Early designs, however, had several disadvantages. Specifically, they were complex, made of numerous components, and, consequently, were expensive to manufacture and difficult to work with.

Some efforts have been made to overcome these disadvantages. One such proposed solution is the utilization of multiple trim units combined with each other and fastened to the article of work as described in U.S. Pat. No. 4,190,304 to Schneider. Another proposed solution discloses a one-piece molded fastener as described in U.S. Pat No. 3,733,658 to Mitchell.

While the above-mentioned inventions do solve some of the disadvantages discussed, their application is limited. Specifically, they disclose decorative nails. They do not disclose a means to enhance the decorative characteristics of an existing nail.

Considering these drawbacks and the proposed solutions, it is clear that a simple low-cost alternative is needed to enhance the decorative characteristics of a common nail used in the carpentry and upholstery trades while in no way diminishing from the utilitarian characteristics of the nail. The following invention accomplishes these goals.

SUMMARY OF THE INVENTION

The invention is a decorative cover for a nail or similar fastening device for use in the carpentry and upholstery trades. The device provides a common nail with any desired decorative characteristic without diminishing from the functionality of the nail.

The invention accomplishes these goals with a relatively simplistic and efficient design, which is essentially comprised of a cover for a nail head and a fastening means. The cover conceals the nail and provides a decorative effect. The fastening means prevents separation of the cover from the nail head as well as prevents any movement of the cover relative to the substance into which the nail is driven.

The nail head cover consists of virtually any shape desired by the creator so long as it accommodates the fastening means and has at least one flat surface.

In the preferred embodiment, the fastening means is made up of two components: a slot and an anchoring prong. The slot is T-shaped and is located within the cover. The slot is oriented in such a way that, upon insertion of the nail head into the slot, the nail head is oriented parallel to the flat surface and the shaft of the nail extends from the cover in a direction perpendicular to the flat surface of the cover.

2

After insertion of a nail head into the cover, the nail is driven into a solid substance by striking the cover. When driven in as far as possible, a portion of the cover is located between the cover and the substance into which the nail is driven, thereby preventing separation of the cover from the nail. This is accomplished through the use and orientation of the T-shaped slot.

The anchoring prong serves to prevent movement of the cover relative to the surface into which the nail is driven. In one embodiment, the anchoring prong consists of a triangular member attached to the flat surface of the cover. As the nail is driven into a solid substance (e.g. wood), the anchoring prong penetrates the same substance. This, in conjunction with a portion of the cover being sandwiched between the nail head and the surface of the substance, prohibits movement of the cover. In application, the cover is attached to the nail head. This is accomplished by inserting the nail head into the slot of the cover such that the nail shaft extends from the cover. The nail is then driven into the desired solid substance by striking the cover. When driven in completely, not only is a portion of the cover sandwiched between the nail head and the surface of the substance, but the anchoring prong penetrates the substance's surface. These two aspects of the invention act together to prevent movement of the cover. At this point, the nail head, as well as the rest of the nail, is completely concealed by the decorative cover, thereby enhancing the aesthetic appearance of the work.

Alternatively, the cover may be attached to the nail head after the nail is partially driven into the substance. The nail is then driven in completely by striking the decorative cover as described previously. In either event, the result is the same—the nail head is entirely concealed by the decorative cover.

The invention, then, provides a simplistic and low-cost way to enhance the decorative characteristics of a nail without sacrificing the nail's functionality.

The invention, together with the various embodiments thereof, will be more fully explained by the accompanying drawings and the following descriptions.

DETAILED DESCRIPTION OF THE INVENTION

Figure 1:
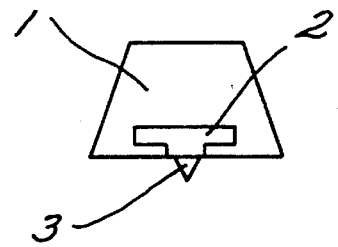
FIG. 1 is a front elevation view of the preferred invention showing the major components and their relation to each other.

FIG. 1 shows the front view of the preferred embodiment of the invention.

The invention is a decorative nail head cover. Nail cover 1 is used to conceal the head of a standard nail and provide a decorative effect for the piece of work on which it is used. Nail cover 1 is shaped in any way desired so long as it accommodates slot 2 and prong 3 which prevent separation of nail cover 1 from the nail and further prevent movement of nail cover 1 with respect to the substance into which the nail is driven.

Slot 2 is T-shaped so as to secure a standard nail and is located along the lower edge of nail cover 1 from which the nail shaft extends. The lower edge of nail cover 1 has a flat portion, assuring the proper orientation of nail cover 1 as the nail to which it is attached is driven into place.

Anchoring prong 3 is located along the lower edge of nail cover 1. Anchoring prong 3 is triangular in shape and, as will be explained in the following paragraphs, is used in conjunction with slot 2 to prevent movement of nail cover 1 relative to the nail.

Figure 1A:
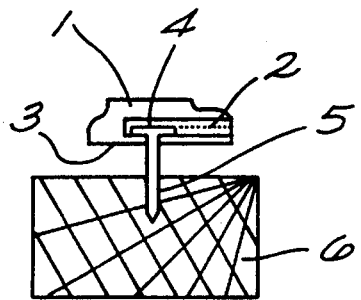
FIG. 1A is a side elevation view of the preferred invention showing the invention in use prior to being driven into a solid substance.
Figure 1B:
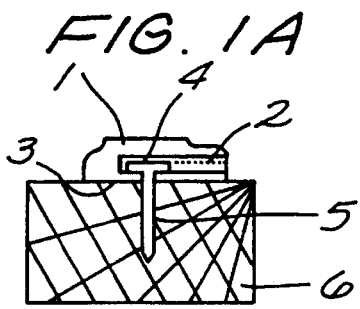
FIG. 1B is a side elevation view of the preferred invention showing the invention in use subsequent to being driven into a solid substance.

The operation of the invention is best shown in FIGS. 1A and 1B. Nail head 4 is inserted in slot 2. Slot 2 is T-shaped and oriented such that nail head 4 is parallel to, and nail shaft 5 is perpendicular to, the flat portion of the bottom surface of nail cover 1.

FIG. 1A shows the operation of the invention as a nail is partially driven into a solid substance 6 (such as wood or plastic). After insertion of a nail head 4 into nail cover 1, nail cover 1 is struck again to drive nail shaft 5 into solid substance 6. Nail cover 1 is made of a substance capable of withstanding such impacts.

FIG. 1B shows the operation of the invention and its orientation after nail shaft 5 is completely driven into substance 6. When nail shaft 5 is driven into substance 6, the bottom edge of nail cover 1 contacts substance 6. This results in a portion of nail cover 6 being sandwiched between nail head 4 and the surface of substance 6, thereby securing nail cover 1 in place.

Nail cover 1 is further secured by anchoring prong 3 which penetrates substance 6 as nail shaft 5 is inserted further into substance 6. Nail prong 3 prevents any movement of nail cover 1 relative to substance 6. This assures that nail cover 1 will not be lost by sliding off of nail head 4.

Figure 2:
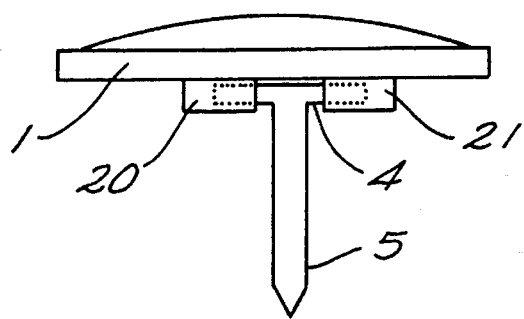
FIG. 2 is a front elevation view of a first alternative embodiment of the invention showing the major components and their relation to each other.

FIG. 2 shows an alternative embodiment of the invention. Instead of using a slot to secure nail cover 1 to nail head 4, clips 20 and 21 are used.

Figure 2A:
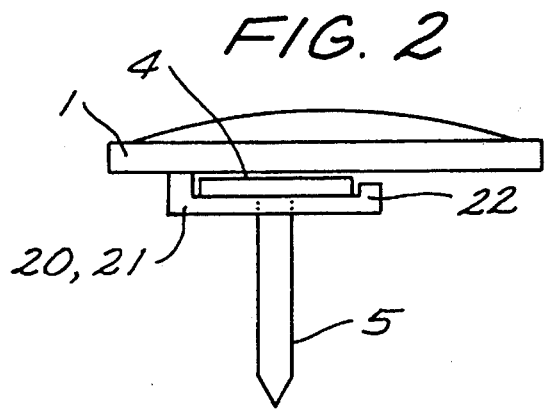
FIG. 2A is a side elevation view of a first alternative embodiment of the invention.

Best shown in FIG. 2A, which is a side view of the alternative embodiment, nail cover 1 has a bottom section which is flat. Nail head 4 is placed between clips 20 and 21 and the flat section of nail cover 1. Clips 20 and 21 further contain lip 22 to prevent nail head 4 from sliding out from clips 20 and 21. This assures the durability of any design on which the invention is used in that the decorative nail covers will not be easily lost.

Figure 3:
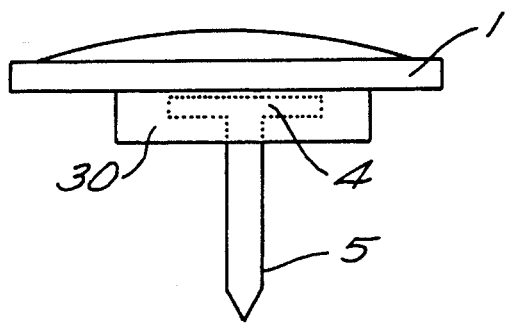
FIG. 3 is a front elevation view of a second alternative embodiment of the invention.

As an alternative, FIG. 3 shows nail cover 1 being secured to nail head 4 by a single clip 30.

Figure 3B:
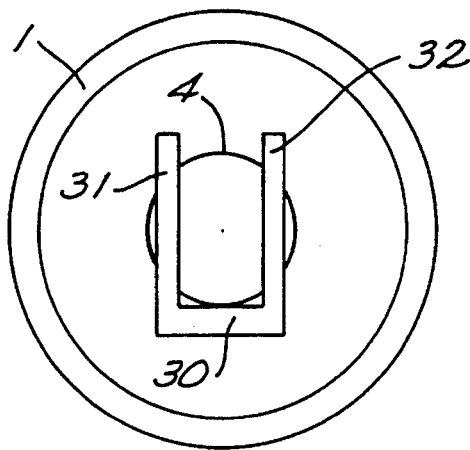
FIG. 3B is a bottom elevation view of a second alternative embodiment of the invention.

As shown in FIG. 3B, clip 30 has two fingers, 31 and 32, to secure nail cover 1 to nail head 4. Nail head 4 is located between fingers 31 and 32 and nail cover 1.

Figure 3A:
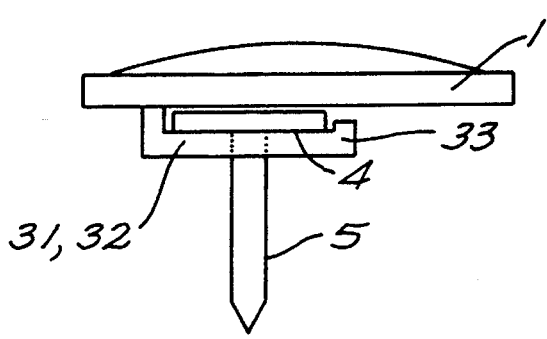
FIG. 3A is a side elevation view of a second alternative embodiment of the invention.

As shown in FIG. 3A, fingers 31 and 32 each have lip 33 to prevent nail head 4 from sliding out from clip 30. This assures that nail cover 1 will not be lost from the finished work.

Figure 4:
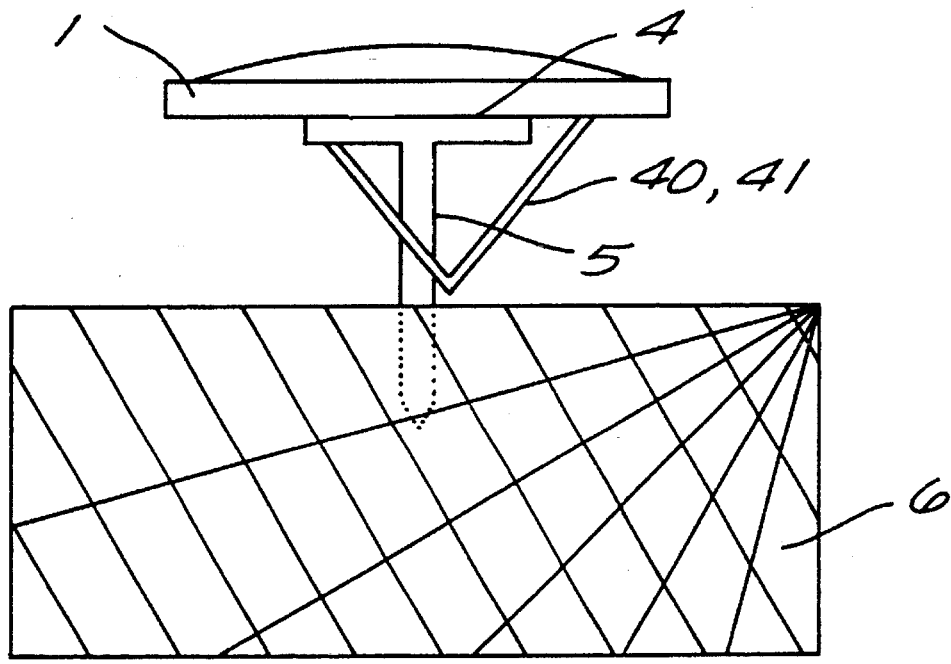
FIG. 4 is a side elevation view of a third alternative embodiment of the invention showing the operation of the invention prior to being driven into a solid substance.

FIG. 4 shows yet another alternative to the method used to fasten nail cover 1 to nail head 4. In this embodiment, two clips 40 and 41 are used to secure nail cover 1 to nail head 4. Clips 40 and 41 are placed opposite each other on either side of nail shaft 5. Initially, clips 40 and 41 are V-shaped. This enables clips 40 and 41 to hold nail cover 1 in place while nail cover 1 is struck to drive nail shaft 5 into substance 6.

Figure 4A:
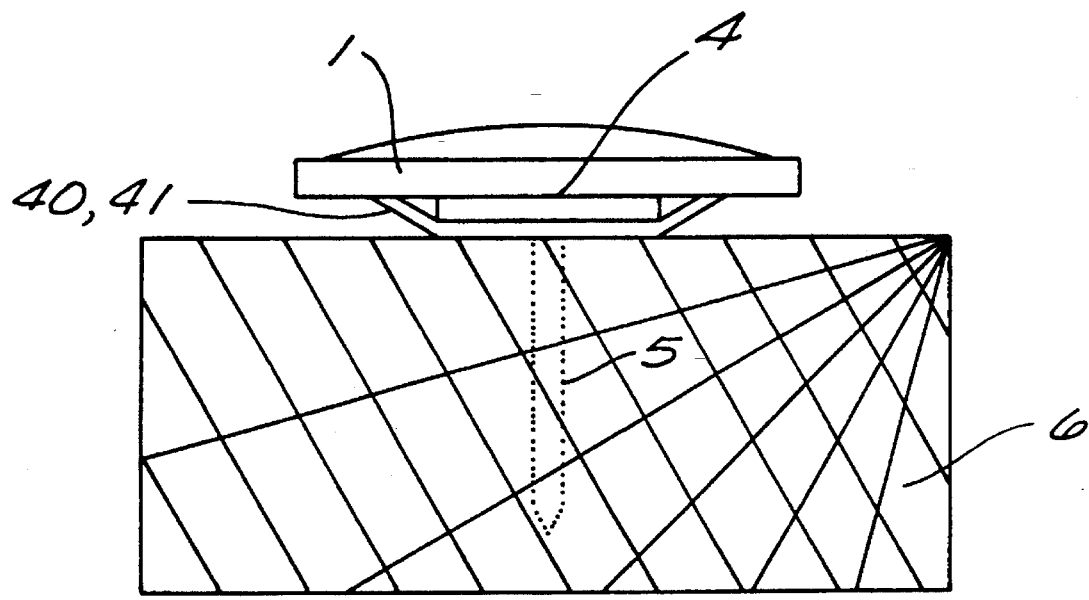
FIG. 4A is a side elevation view of a third alternative embodiment of the invention showing the operation of the invention subsequent to being driven into a solid substance.

FIG. 4A shows the shape of clips 40 and 41 subsequent to nail shaft 5 being driven into substance 6. After nail shaft 5 is fully driven into substance 6, clips 40 and 41 are no longer V-shaped. Instead, as they make contact with the surface of substance 6, clips 40 and 41 straighten out and enclose nail head 4. Nail head 4 is sandwiched between nail cover 1 and clips 40 and 41 and enclosed by the shaping of clips 40 and 41. This assures that nail cover 1 will not be separated from nail head 4 after insertion of nail head 4 into substance 6.

From the foregoing, it is understood by those skilled in the art that the disclosed invention is a decorative cover for a nail or other similar fastener used in the upholstery and carpentry trades. While the invention is used with any traditional nail to provide aesthetic qualities thereby enhancing the body of work, the invention in no way detracts from the functional characteristics of the nail on which it is used.

What is claimed is:

1. A decorative nail cover comprising a decorative member for covering a head of a nail, said nail for insertion into a solid substance, said decorative member having a slot for attaching said decorative member to said nail head, and further having at least one anchoring prong adapted for at least partial insertion into said solid substance.

2. The decorative nail cover according to claim 1 wherein said decorative member has at least one substantially flat surface.

3. The decorative nail cover according to claim 2 wherein said anchoring prong is fixably attached to said at least one substantially flat surface, and wherein said anchoring prong further consists of a substantially triangular member for penetration into said solid substance.

4. The decorative nail cover according to claim 2 wherein an axis of said slot lies in a plane parallel to said at least one substantially flat surface.

5. The decorative nail cover according to claim 4 wherein said slot has a cross-section substantially T-shaped, said slot oriented such that upon insertion of the nail head into said slot, said nail head is substantially parallel to said at least one substantially flat surface and, further wherein the shaft of said nail extends from said decorative member substantially perpendicular to said at least one substantially flat surface.

6. The decorative nail cover according to claim 5 wherein, after insertion of said nail into said solid substance, at least a portion of said decorative member is located between said nail head and said solid substance.

7. A decorative assembly comprising:
 a) a nail having a flat head member attached to a spike member for insertion into a solid substance; and,
 b) a decorative member having at least one substantially flat surface and being securable to and totally covering said flat head member of said nail, after application of said decorative cover to said flat head member and application of said nail to said solid substance, said at least one substantially flat surface of said decorative member contacting a surface portion of said solid substance and wherein said decorative member includes an anchoring prong, said anchoring prong being partially inserted into said solid substance.

8. The decorative assembly according to claim 7 wherein said decorative member has a cavity for receiving said flat head member of said nail.

9. The decorative assembly according to claim 8 wherein said cavity has a cross-section substantially T-shaped such that, upon insertion of said flat head member of said nail, said flat head member is substantially parallel to said at least one substantially flat surface and further wherein said spike member of said nail extends from said decorative member substantially perpendicular to said at least one substantially flat surface.

10. The decorative assembly according to claim 9 wherein, upon insertion of said spike member of said nail into said solid substance, at least a portion of said decorative member is located between said flat head member of said nail and the surface of said solid substance.

11. The decorative assembly according to claim 9 wherein said anchoring prong consists of a substantially conical member for penetration into said solid substance.

12. A nail cover for covering the head of a nail comprising a decorative member having a fastening means for securing said decorative member to said nail head and an anchoring prong for partial insertion into a solid substance.

13. The nail cover according to claim 12 wherein said decorative member includes at least one substantially flat surface.

14. The nail cover according to claim 13 wherein said fastening means includes at least one clip having at least one finger, said fastening means attached to said at least one substantially flat surface.

15. The nail cover according to claim 14 wherein said at least one finger is substantially parallel to said at least one substantially flat surface, said at least one finger for fastening said decorative member to said nail head.

16. The nail cover according to claim 15 wherein, upon attachment of said nail cover to said nail head, said nail head is located between said at least one finger and said at least one substantially flat surface of said decorative member.

17. The nail cover according to claim 16 wherein, upon insertion of said nail into a solid substance, at least a portion of said at least one finger is located between said nail head and said solid substance.

* * * * *